Witnesses
J. Milton Jester
B. F. Fishburne

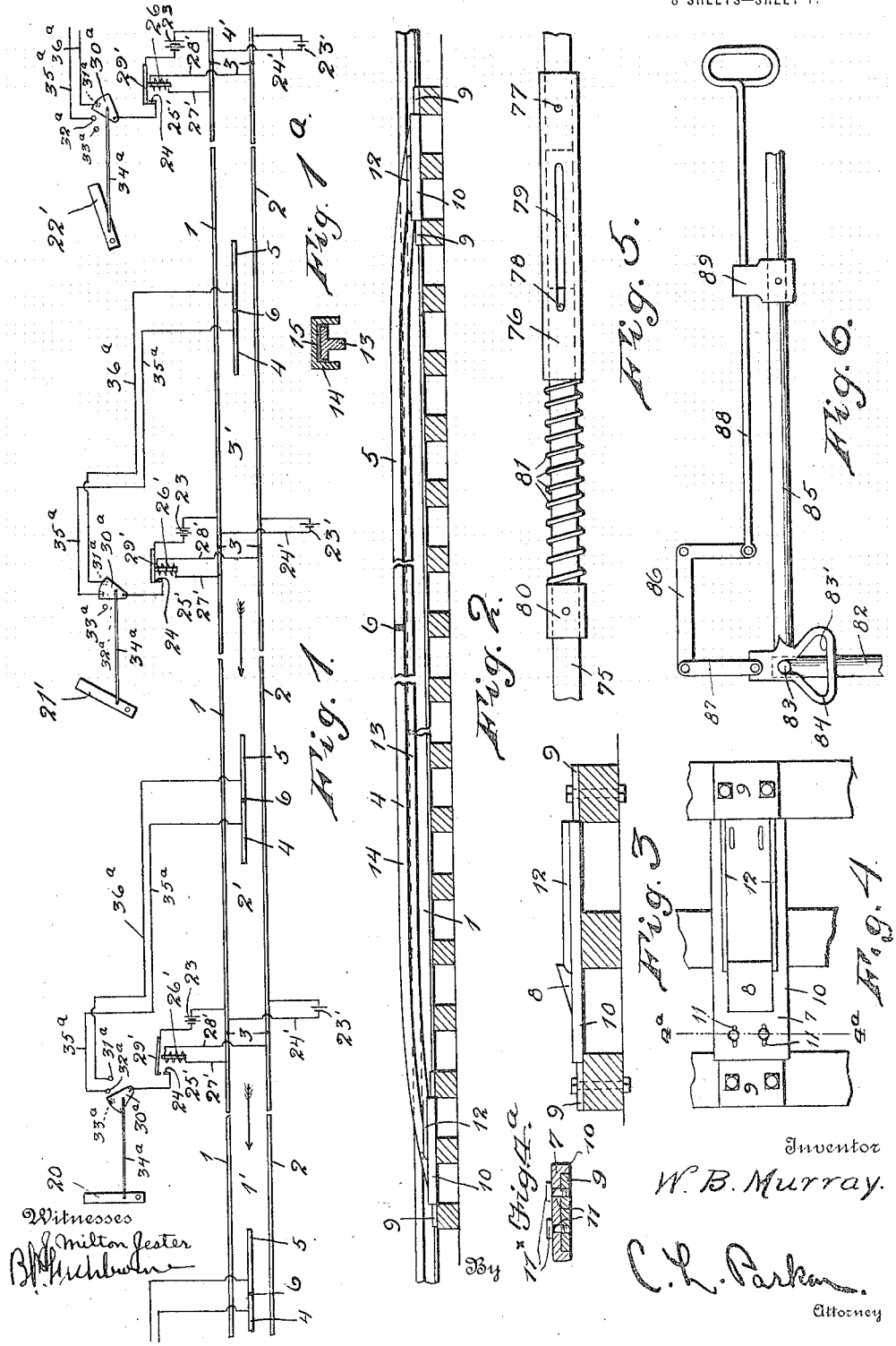

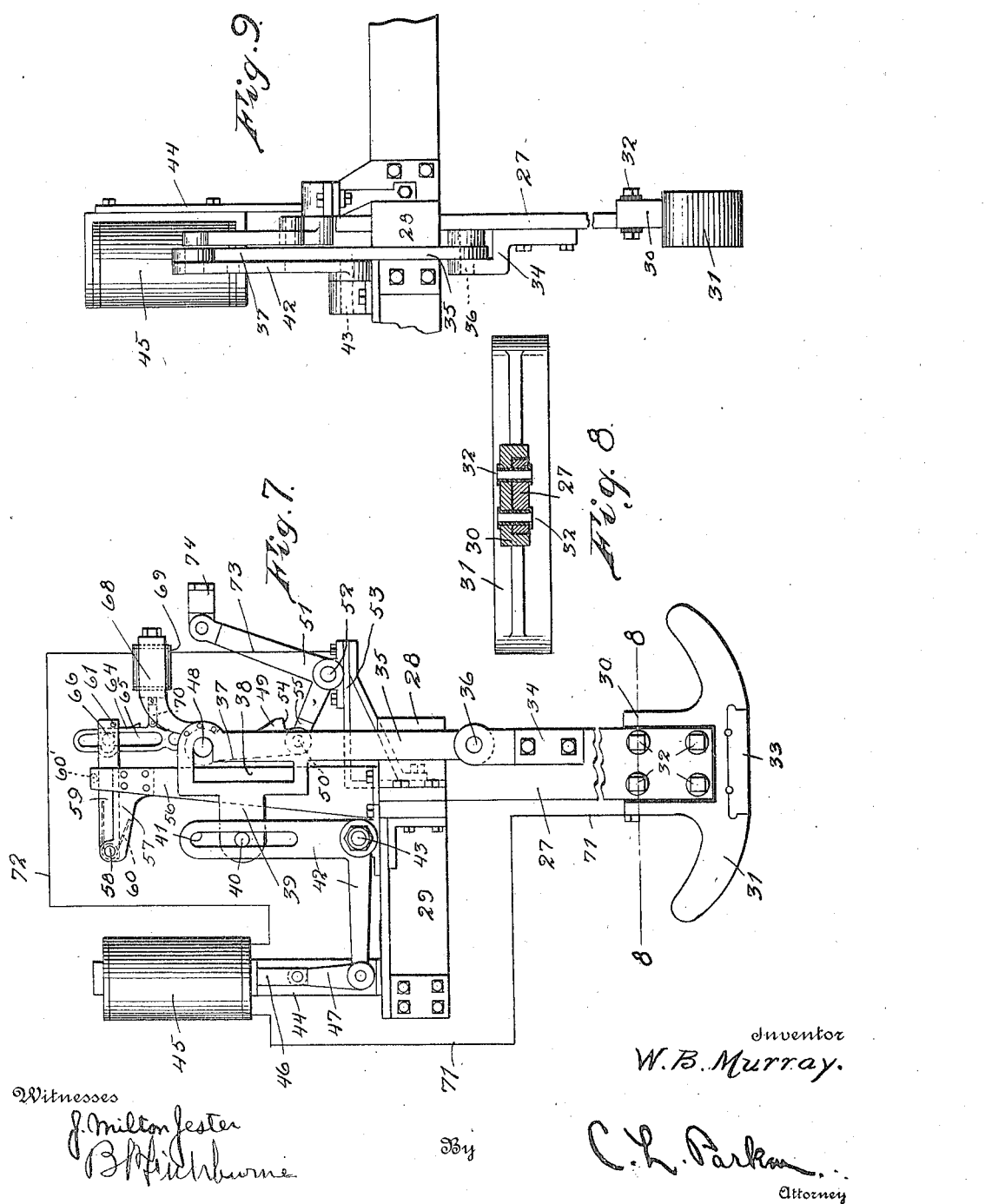

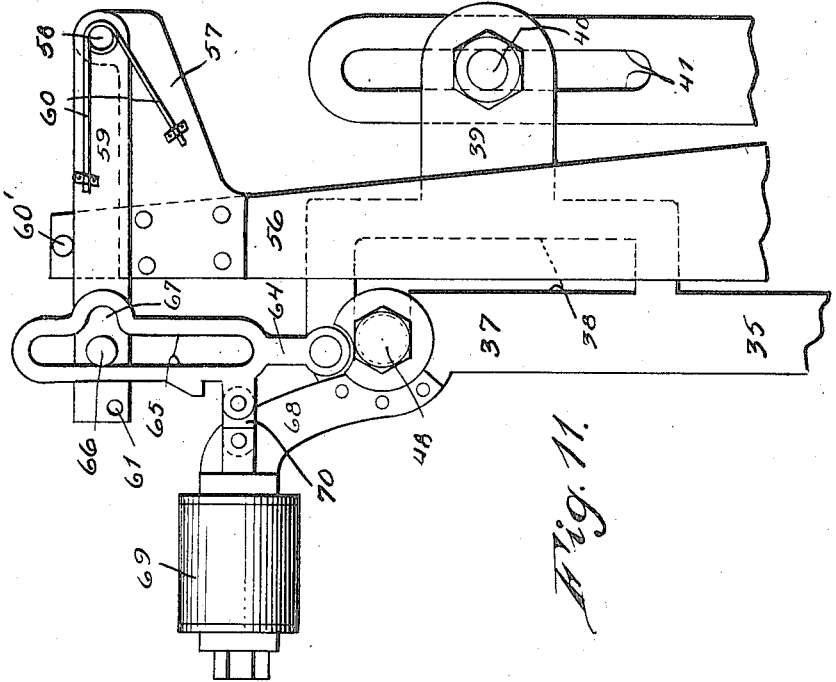
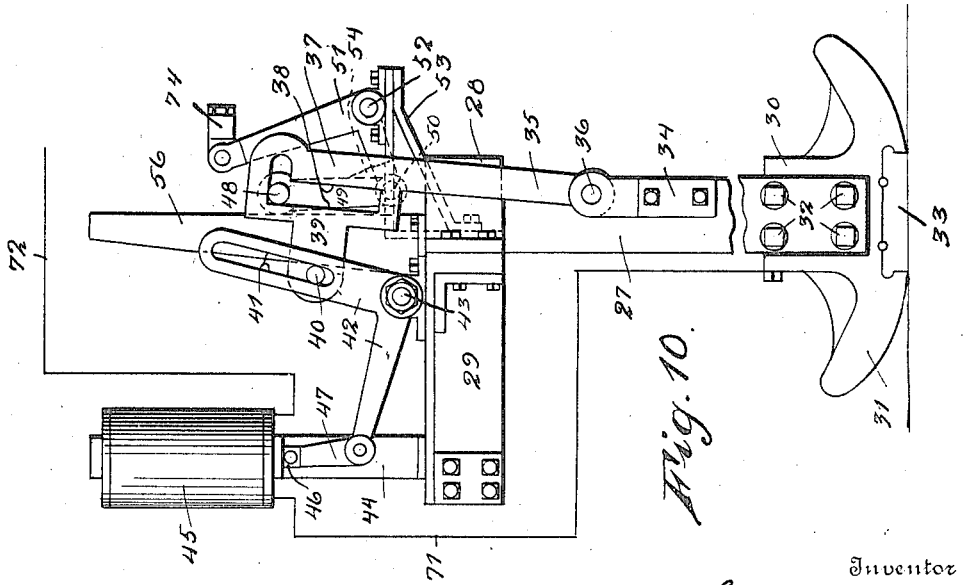

Inventor
W. B. Murray.
By C. L. Parker

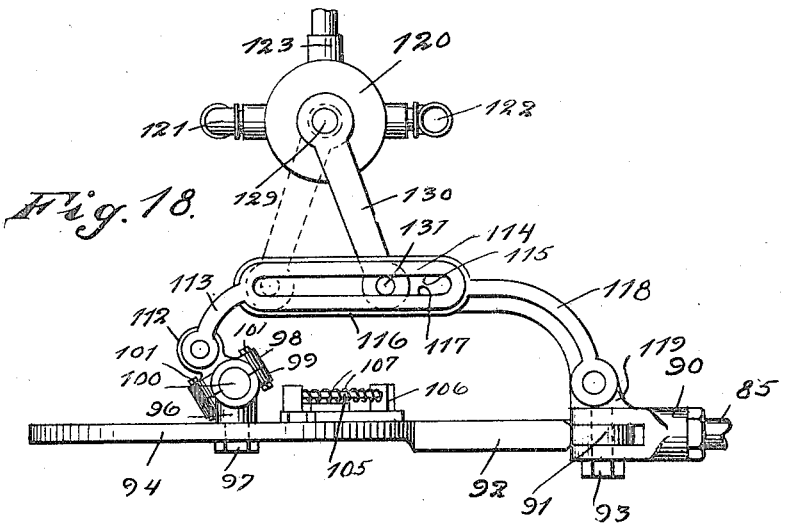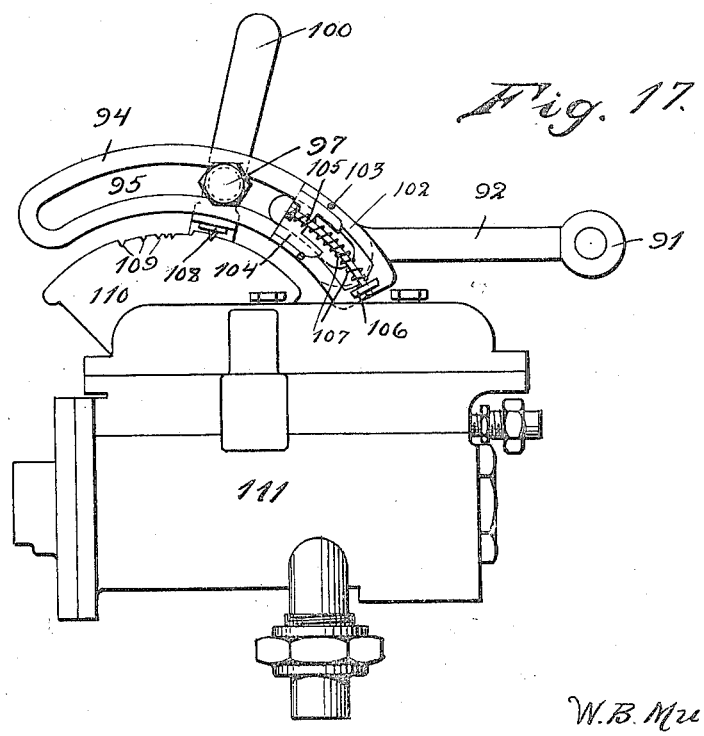

W. B. MURRAY.
MECHANICALLY OPERATED ELECTRICALLY CONTROLLED TRAIN CONTROL SYSTEM.
APPLICATION FILED JULY 12, 1911.

1,180,787.

Patented Apr. 25, 1916.
8 SHEETS—SHEET 7.

Inventor
W. B. Murray.

Witnesses
J. Milton Lester
B. F. Milbourne

By
C. L. Parker
Attorney

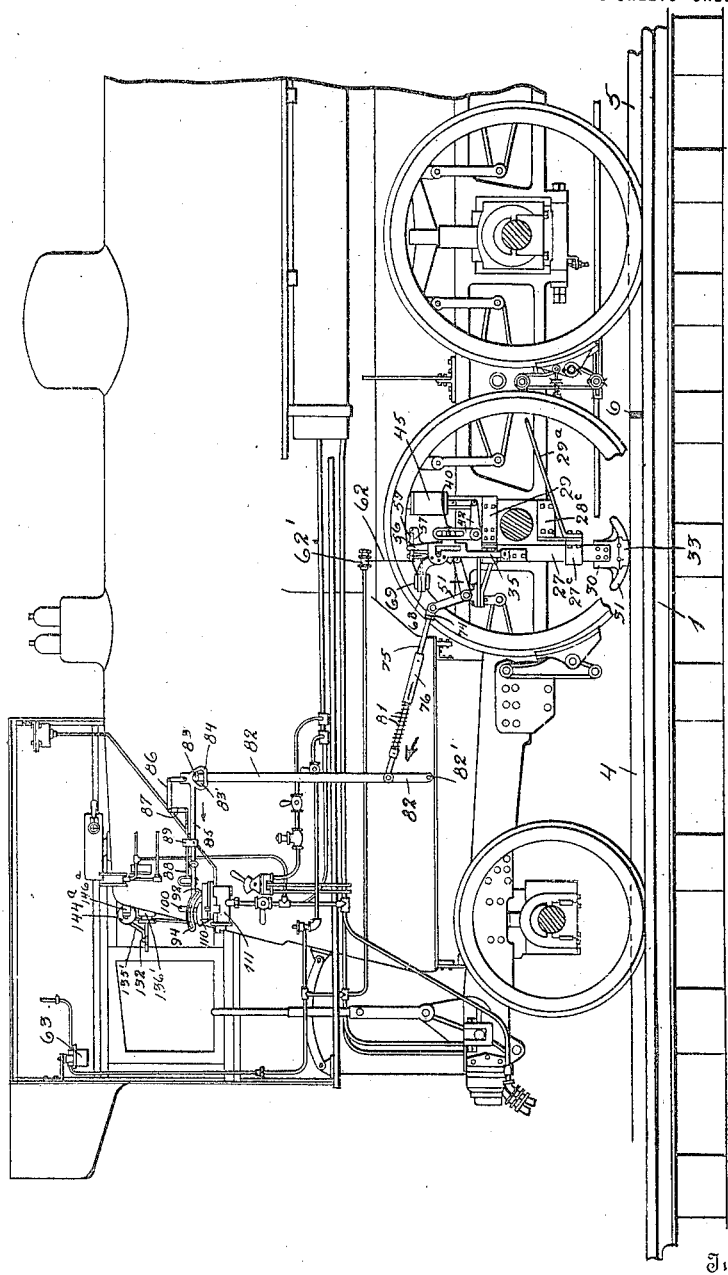

UNITED STATES PATENT OFFICE

WILLIAM B. MURRAY, OF WASHINGTON, DISTRICT OF COLUMBIA, ASSIG
MILLER TRAIN CONTROL CORPORATION, OF STAUNTON, VIRGINIA, A C
OF VIRGINIA.

MECHANICALLY-OPERATED ELECTRICALLY-CONTROLLED TRAIN-CONTROL SYSTEM.

1,180,787.  Specification of Letters Patent.  Patented Apr. 25, 1916.

Application filed July 12, 1911. Serial No. 638,108.

*To all whom it may concern:*

Be it known that I, WILLIAM B. MURRAY, a citizen of the United States, residing at Washington, in the District of Columbia, have invented certain new and useful Improvements in Mechanically-Operated Electrically-Controlled Train-Control Systems, of which the following is a specification.

This invention relates to a mechanically operated and electrically controlled train control system.

The present invention aims to provide train stopping apparatus especially adapted for use in connection with a three-point railway signal system, whereby when the signal is at danger the engine will be automatically stopped, when the signal is at caution a signal in the cab will be operated to apprise the engineer of the conditions without stopping the engine, and when the signal is clear the engine will be permitted to pass.

A further object of this invention is to provide train stopping means operated in conjunction with signal means, and adapted to stop the train when the signal means are falsely set to indicate a clear block when in fact the block is occupied.

A further object of this invention is to provide mechanically operated automatic apparatus of the above mentioned character, adapted to take care of the engine irrespective of the inaction of the engineer but not to take the engine from the active control of the engineer.

A further object of my invention is to provide novel and practical means for cutting off the motive power and applying the brakes in times of danger.

A further object of this invention is to provide in addition to the means for stopping the engine, electrically operated means for actuating a signal in the cab for indicating caution.

A further object of this invention is to provide means whereby the engineer at will or by orders may disconnect or render inoperative the apparatus for stopping the engine, so that the engine may be run by danger signals, when the circumstances require it.

Other objects and advantages of the present invention will be apparent during the course of the following description.

Figure 12:
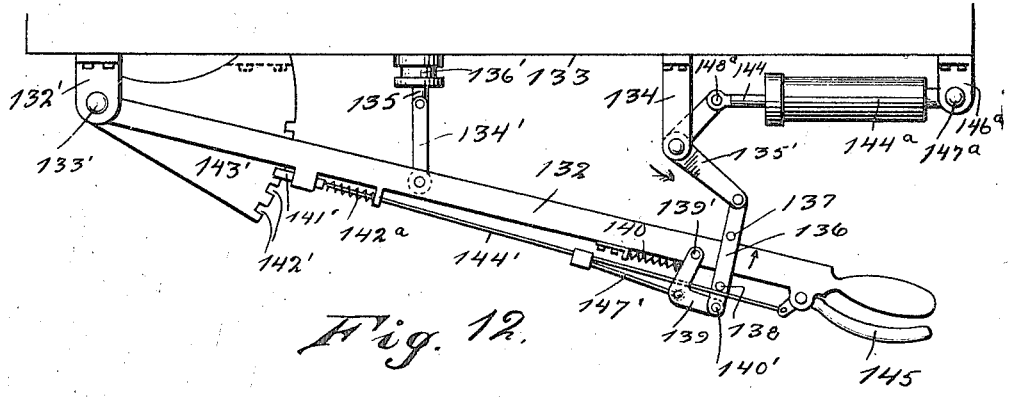
Figure 13:
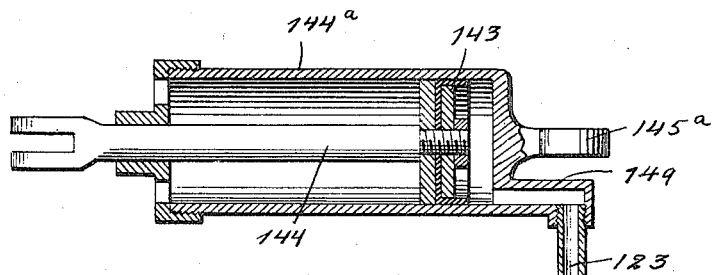
Figures 14, 15:
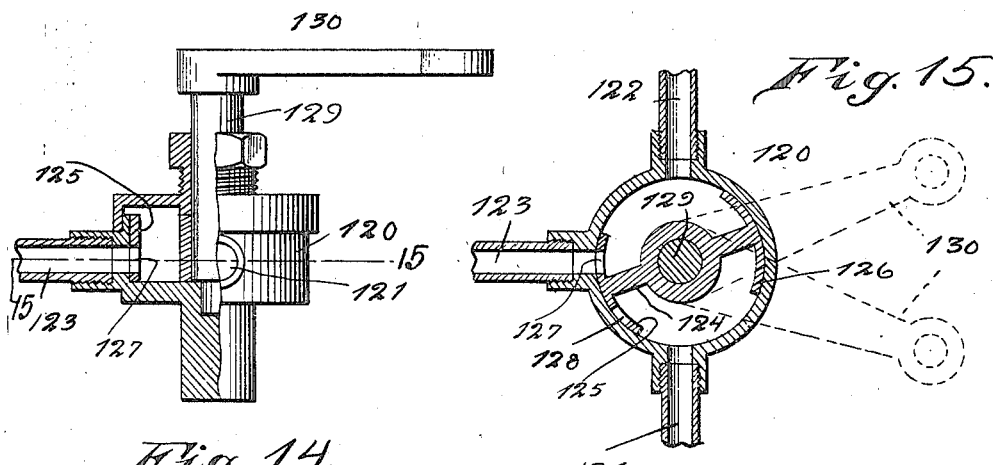
Figure 16:
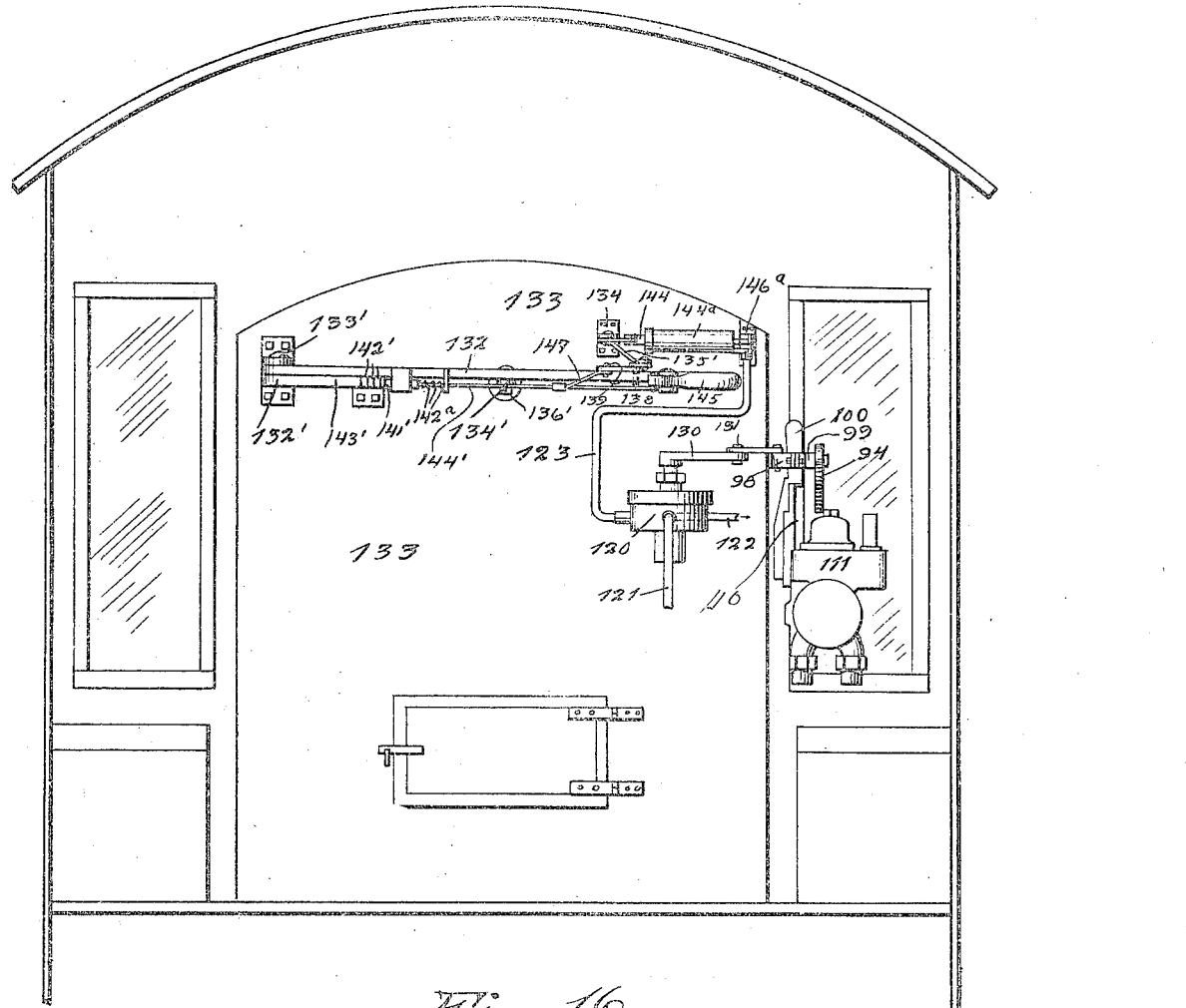
Figure 20:
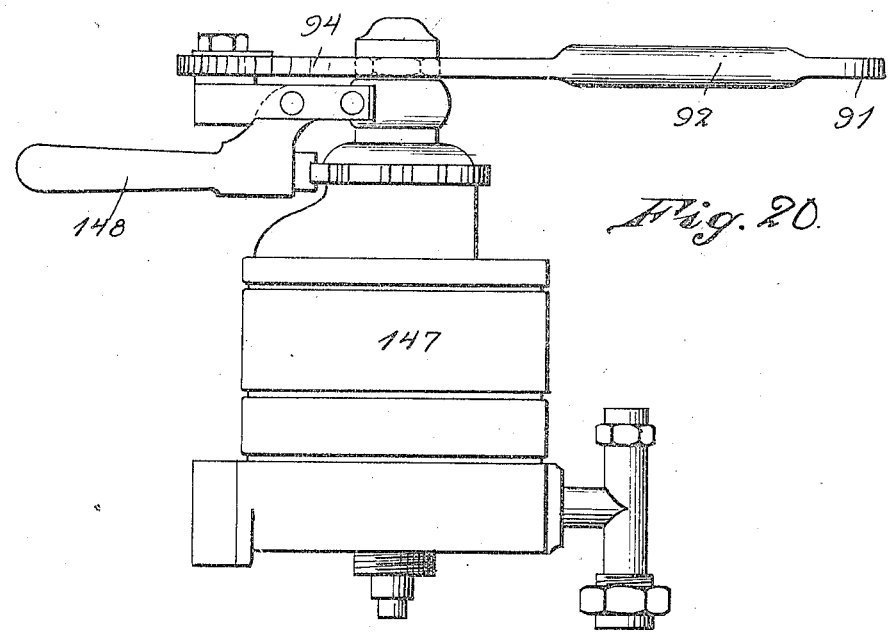
Figure 19:
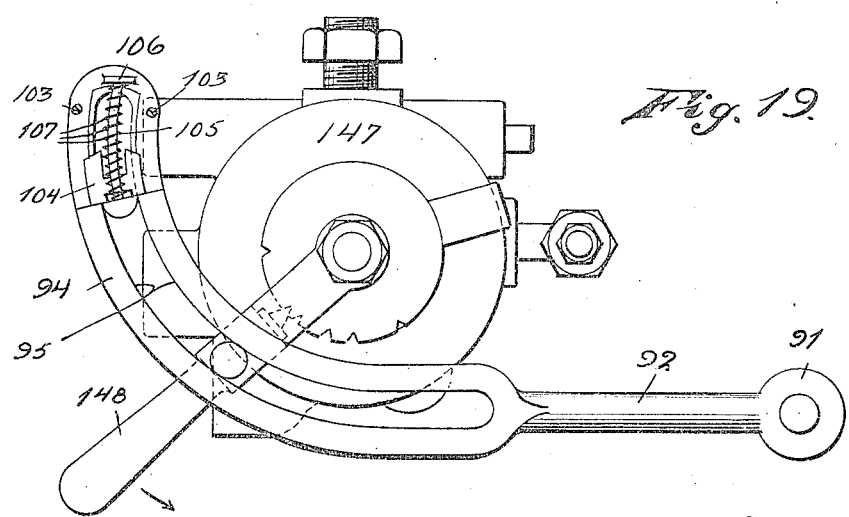

In the accompanying drawings forming a part of this specification and in which like numerals are employed to designate like parts throughout the same, Figure 1 is a diagrammatic view of a track and associated circuits, Fig. 1ª is a cross-sectional view of the ramp, Fig. 2 is an enlarged side view of the ramp, Fig. 3 is a similar view of a movable plate for holding one end of the ramp, Fig. 4 is a plan view of the same, Fig. 4ª is a sectional view taken on line 4ª—4ª of Fig. 4, Fig. 5 is an enlarged fragmentary side view of a push-rod included in the apparatus, showing means carried by it whereby the same may be shortened and extended, Fig. 6 is a side view of apparatus to be connected with the push-rod and means for operating the brake-applying valve and the means for cutting off the steam, Fig. 7 is a side view of mechanically operated and electrically controlled apparatus, which is carried by the engine and adapted to operate the push-rod and signaling means in the engine cab, such apparatus being shown in its elevated position, Fig. 8 is a horizontal sectional view taken on line 8—8 of Fig. 7, Fig. 9 is a rear end view of the apparatus shown in Fig. 7, Fig. 10 is a view like Fig. 7, except that the apparatus is shown in its lowered position and the signal operating means is omitted, Fig. 11 is an enlarged side view of the signal operated means, Fig. 12 is a plan view of the throttle-lever and associated mechanism for operating the same, Fig. 13 is a central vertical longitudinal sectional view through a cylinder included in the throttle-lever operating mechanism, Fig. 14 is a side view, partly in section, of a three-way valve structure, Fig. 15 is a horizontal sectional view taken on line 15—15 of Fig. 14, Fig. 16 is a rear end view of the boiler of a railway locomotive, showing the throttle-lever operating mechanism and associated members applied thereto, Fig. 17 is a side view of a New York air brake valve, showing my improved means for operating the controlling lever of the same, Fig. 18 is a plan view of the operating means shown in Fig. 17, showing means attached thereto for operating the three-way valve structure, Fig. 19 is a plan view of a Westinghouse air brake valve, showing my improved means attached thereto for operating the controlling lever, Fig. 20 is a side view of the same, and, Fig. 21 is a fragmentary side view of a rail-way locomotive, showing the entire apparatus applied thereto.

In Fig. 1, the numerals 1 and 2 designate track rails, insulated at spaced intervals, as shown at 3, to divide the track into a plurality of blocks of suitable length, which are designated 1', 2', 3' and 4'. Within each block and near the entrance end of the adjacent block to the left is arranged a ramp, which is curved longitudinally in a vertical plane and formed of two ramp-sections 4 and 5, which are insulated from each other, as shown at 6. The ramp is mounted at its ends upon slidable plates 7, each of which carries an upstanding beveled lug 8, having a recess 8ª to receive the end of the ramp. The ramp is rigidly attached to the lug 8 by any suitable means. The slidable plates 7 are mounted upon stationary plates 9 and have longitudinal depending flanges 10 disposed upon opposite sides of the plate 9. The plate 7 is provided near its ends with elongated slots 11, to receive bolts 11ˣ carried by the stationary plate 9. Each of the plates 7 is provided upon its upper face with longitudinal spaced ribs 12. Each of the ramp-sections 4 and 5 is formed of an inner T-rail 13 and an outer rail 14, which is inverted U-shaped in cross-section, as clearly shown in Fig. 1ª. Insulating material 15 is disposed between the rails 13 and 14. The vertical sides of the rail 14 fits snugly between the ribs 12. From the description of the above referred to parts, it is obvious that means are provided to hold the ramp in place but yet permit of a slight longitudinal movement of the ramp, which becomes necessary when the same expands or contracts owing to the changes in its temperature.

The engines are run into the blocks in one direction, that is the traffic is from the right to the left, as shown by the arrows. As the right or entrance end of the blocks 1', 2' and 3' are disposed semaphores, comprising paddles 20' 21' and 22', respectively. It is to be understood that a semaphore is placed at the entrance end of each of the remaining blocks (not shown). The paddles are adapted to assume three positions, a horizontal to indicate danger as shown by the paddle 20', an intermediate position to indicate caution as shown by the paddle 21', and a lowermost position to indicate a clear track as shown by the paddle 22'. These paddles may be either manually moved or operated by an automatic electrical control system. The ramp sections 4 and 5 are disposed in the blocks near the entrance end of the blocks to the left and control the passing of the engine into the next block to the left. As the exit end of each block is disposed a source of current 23' connected by a wire with the rail 2 and connected with the rail 1 by a wire 24'. Disposed at the entrance end of each block is a relay 25', comprising an electro-magnet 26', having its winding connected with the rails 1 and 2 by wires 27' and 28'. An armature 29' is disposed near the end of the electro-magnet 26' and is held adjacent the electro-magnet while the same is energized but will automatically move away from the same when the electro-magnet is deënergized. As long as an engine does not enter the block it is obvious that a circuit is closed and current will flow from one side of the source of current 23' through rail 2, through wire 28', through electro-magnet 26', through rail 1, and through wire 24' back to the source of current 23'. When an engine travels into the entrance end of the block, the above referred to circuit is made through the engine and the electro-magnet 26' is cut out of circuit.

The numeral 23 designates a source of current having one pole electrically connected with the rail 1 and its opposite pole connected with the armature 29'. A stationary contact 24 is disposed near the armature 29' and is adapted to be engaged by the same when the electro-magnet 26' is energized and disengaged when the electro-magnet is deënergized. The stationary contact 24 has electrical connection with a pivoted contact segment 30ª, adapted to engage and disengage spaced stationary contacts 31ª, 32ª and 33ª. The contact segment 30ª swings in a vertical plane and is adapted to assume three positions, an uppermost to engage contact 33ª, an intermediate positon to engage both contacts 32ª and 31ª and a lowermost position to engage contact 31ª. This contact segment is moved synchronously with its adjacent signal paddle and has operative connection with the same through the medium of a rigid rod 34ª, having suitable pivotal connection with the paddle and the contact segment. Connected with the contact 32ª is a wire 35ª, having connection with the ramp-section 4 and connected with the contact 31ª is a wire 36ª having connection with the ramp-section 5.

From the description of the above referred to parts, it is obvious that when the paddle is in its horizontal position both ramp-sections 4 and 5 are disconnected from the source of current 23, when the paddle is in its intermediate position both ramp-sections have connections with the source of current, and when the paddle is in its lowermost position the ramp-section 4 is disconnected from the source of current and the ramp-section 5 connected with the same. Attention is called to the fact that the energizing and deënergizing of the ramp-sections work true with the signal paddle as long as the signal paddle is true. If the signal paddle at the entrance to a block is in its lowermost position to indicate a clear block but in fact the block is occupied, the electromagnet 26' will be deënergized by the engine cutting the same out of the track circuit and hence both of the ramp-sections 4 and 5 near the entrance end of the block will be disconnected from the source of current, although according to the position of the paddle the ramp-section 5 should have had electrical connection with said source of current.

Attention is now called to Figs. 7, 8, 9, 10, 11 and 21, wherein is shown a mechanically operated and electrically controlled apparatus, which is carried by the engine. This apparatus comprises a vertically movable structure including a bar 27, the upper end of which is slidably mounted in a socket 28, rigidly attached to a bracket 29, which is suitably secured to the framework of the engine. The relative location of this apparatus is shown in Fig. 21. The lower portion of the reciprocatory bar 27 operates within a guide-socket 27ᶜ, which is held in place by a bracket 28ᶜ and a brace-rod 29ᵃ, as clearly shown in Fig. 21. The lower end of the bar 27 fits within a recess formed upon one side of a shank 30 of a shoe 31. The bar 27 is insulated from the shank 30 and is rigidly attached thereto by bolts 32. The shoe 31 is adapted to engage the ramps and to be elevated thereby.

In order that the shoe 31 may not suffer from wear owing to its engagement with the ramps, I provide a removable block 33, which is preferably formed of hard steel. This block is mounted within a recess formed in the lower portion of the shoe 31 and is held therein by suitable means and is adapted to conduct an electric current from the ramp to the shoe 31. The bar 27 has a bracket 34 rigidly connected therewith intermediate the ends thereof, to which bracket is pivotally connected a swinging arm 35, as shown at 36. The upper portion of the swinging arm 35 is provided with an enlarged head 37, through which is formed an inverted L-shaped slot 38, as shown. The head 37 carries a lateral extension or ear 39, provided with a pin 40, to operate within an elongated slot 41 formed through the vertical arm of a bell-crank lever 42. This bell-crank lever is pivotally mounted upon the bracket 29, as shown at 43. An upright 44 is rigidly mounted upon the bracket 29 and serves to rigidly hold a solenoid 45, having a movable core 46, which is connected to the horizontal arm of the bell-crank lever 42 through the medium of a pivotal link 47. When the solenoid 45 is energized, the bell-crank lever 42 is moved to swing the arm 35 to the right, whereby a pin 48 is positioned in the vertical portion of the slot 38. The pin 48 has rigid connection with the upper end or head of a swinging arm 49, pivoted as shown at 50, with the horizontal arm of a bell-crank lever 51, which is pivoted as shown at 52, with a stationary bracket 53, preferably attached to the support o  acket 29. The swinging arm 49 carries upon its outer side a laterally extending lug 54, adapted to engage a corresponding lug 55 carried by the horizontal arm of the bell-crank lever 51. The function of these lugs is to prevent the arm 49 from swinging to the right with relation to the bell-crank lever 51.

Rigidly mounted upon the bracket 29 is an upright 56, disposed to one side of the head 37, as shown. At the upper end of the upright 56 is rigidly attached a horizontal arm 57, to which is pivoted, as shown at 58, a vertically swinging lever 59, which is urged upwardly by a spring 60, to engage a stop 60'. The lever 59 and associated members are disposed upon the opposite side of the bar 27 with relation to the arm 35. This lever is apertured at its free end as shown at 61, for connection with a cable 62, which has connection with a discharge valve 62', carried by the engine and adapted when operated to sound the whistle 63. This is the customary whistle provided on all engines and is generally operated by the conductor or other attendant pulling a cord extending through the cars. When the lever 59 is swung downwardly the discharge valve 62' is operated. Pivotally mounted upon the upper end of the swinging arm 35, is a swinging arm 64, provided with an elongated slot 65, within which operates a pin 66 carried by the lever 59. The inner wall of the slot 65 is provided with a recess 67, adapted to receive the pin 66, when the swinging arm 64 is swung to the right and held in this position by means to be next described. A curved arm 68 is rigidly connected with the head 37 and serves to rigidly hold a solenoid 69, having its movable core connected with the swinging arm 64 through the medium of a pivotal link 70.

The shoe 31 is electrically connected with the solenoid 45 by a wire 71 and solenoid 45 is connected in series with the solenoid 69 by a wire 72. A wire 73 is connected with one end of the winding of the solenoid 69 and is connected with the bracket 53 and hence is grounded to the frame of the engine. From the description of the above referred to parts, it is obvious that the two solenoids 45 and 69 are simultaneously energized and deënergized.

When the solenoid 45 is deënergized and the shoe 31 is elevated by its engagement with the ramp, the pin 48 remains within the horizontal portion of the slot 38 and is caught by the shoulder of such slot and carried upwardly as the shoe is elevated. The arm 49 is thus elevated to turn the bell-crank lever 51 to the right. A coupling 74 is pivotally connected with the vertical arm of the bell-crank lever 51 and a push-rod 75 (see Figs. 5 and 21) has connection with the coupling. This push-rod is preferably formed in two sections, one of which has a tubular sleeve 76 rigidly attached thereto by means of a pin 77 or the like. The other section is slidably mounted within the sleeve 76 and carries a transverse pin 78 to operate within an elongated slot 79. One of the sections 75 carries a collar 80 fast thereon, which engages a suitably stiff compressible coil spring 81, surrounding the section 75 and engaging the sleeve 76. The function of having the push-rod 75 formed in two sections and thus collapsible to a certain degree, is to provide against any undue longitudinal movement of the same, it being understood that the spring 81 is sufficiently stiff so that the rod will not collapse when fulfilling its proper function by being moved in a proper manner. The push-rod 75 extends rearwardly toward the engine cab and is pivotally connected with the lower portion of a vertical swinging lever 82, pivoted at its lower end, as shown at 82'. The upper end of the lever 82 is provided with a laterally extending pin 83, adapted to operate within an opening 83' formed in a head 84, which is rigidly attached to an upper push-rod 85, extending into the cap. The head 84 may be raised and lowered by swinging a pivoted bell-crank lever 86, connected with said head through the medium of a pivotal link 87. The bell-crank lever 86 is swung by a reciprocatory rod 88, operating in a bracket 89 carried by the upper push-rod 85. The pin 83 is normally positioned within the upper small vertical portion of the opening 83', whereby a longitudinal movement of the lower push-rod 75 will effect a longitudinal movement of the upper push-rod. When, however, the head 84 is swung upwardly, the pin 83 will operate within the lower large portion of the opening 83', whereby the movement of the lower push-rod will not be imparted to the upper push-rod 85. The push-rod 85 has one end thereof suitably connected with a coupling 90, (see Figs. 17 and 18) which coupling is bifurcated to receive an apertured head 91 carried by a rigid shaft 92, the head 91 being pivotally connected to the coupling 90 by a bolt 93. Rigidly attached to the free end of the shaft 92 is a segment 94, provided with a curved slot 95, to slidably receive a reduced portion of a pin 96, having the extreme outer portion thereof screw-threaded for receiving a nut 97. The pin 96 carries upon one end a clamp formed of two parts, 98 and 99, engaging an operating lever 100 of a New York air brake valve. The parts 98 and 99 are held together by screws 101 or the like. Mounted upon the segment 94 adjacent shaft 92 is a plate 102, held fast to the segment by screws 103 and adapted to be adjusted longitudinally of the segment to permanently regulate the amount of pressure to be employed in applying the brakes. Slidably mounted upon the plate 102 is a stop 104, having an aperture lug formed thereon for rigidly holding a curved rod 105, one end of which operates in an apertured fixed lug 106. Surrounding the curved rod 105 is a compressible coil spring 107, opposed to the movement of the stop 104 in that direction. When the segment 94 has been moved longitudinally to the left sufficiently, stop 104 engages pin 96 and will swing lever 100 to operate the valve and thereby apply the brakes. The spring 107 takes up all undue shocks. The lever 100 carries a latch device 108 adapted to fit within a selected one of notches 109 of segment 110, whereby after lever 100 has been swung to apply the brakes it will be held in its new position until released by the engineer, since the return movement of segment 94 does not oscillate the lever 100.

Numeral 111 designates the body portion or casing of the valve and as this valve is old and no claim is made thereto, no further description of the same will be here given.

The part 98 of the above referred to clamp is provided with an ear 112, to which is pivoted a curved arm 113 carrying at one end a plate 114, provided with an elongated slot 115. Disposed below and in slidable engagement with plate 114 is a plate 116, having an elongated slot 117 adapted to register with the slot 115. The plate 116 is formed upon a curved arm 118, which is pivotally connected with an ear 119 carried by coupling 90.

The numeral 120 designates a three-way valve structure (see Figs. 14 and 15) comprising an outer casing provided with a pressure supply pipe 121, an exhaust pipe 122 and a cylinder pipe 123. Mounted to oscillate within the casing 120 is a valve 124, including segmental plates 125 and 126, the plate 125 being provided with openings 127 and 128 formed therethrough. When the opening 127 is in registration with the opening of pipe 123 communication is had between pipe 123 and the exhaust pipe 122. When opening 128 is in registration with the opening of pipe 123 communication is established between pipe 123 and pipe 121, to supply compressed air to the pipe 123, it being understood that the pipe 121 has communication with a source of compressed air. The valve 124 is rigidly mounted upon a pivoted stem 129, extending through the upper portion of the sleeve included in the valve structure 120 and having rigid connection with a lever 130. As clearly shown in Fig. 18, this lever 130 carries an upstanding pin 131 at its outer end, which pin is disposed to operate within slots 115 and 117. When lever 130 occupies the position shown in Fig. 18, communication is had between pipes 123 and 122. Upon sufficient longitudinal movement of the push-rod 85 in the direction of the arrow, the end wall of slot 115 engages pin 131 to oscillate lever 130 until the same assumes its other position as shown in dotted lines in Fig. 18, whereupon compressed air will be fed from pipe 121 into pipe 123.

Attention is called more particularly to Figs. 12 and 16, wherein 132 designates a throttle-lever of the engine, which is mounted upon the rear end or face 133 of the boiler. One end of the throttle-lever 132 is pivoted to a bracket 132′ as shown at 133′, said bracket being rigidly attached to the head 133. The throttle-lever 132 is pivotally connected intermediate its ends with a link 134′, having connection with a valve stem 135, which operates through a stuffing-box 136′. Rigidly attached to the face 133 of the boiler and positioned between the same and the throttle-lever 132 is a stationary arm 134, to the outer end of which is pivoted a bell-crank lever 135′, as shown. A link 136 has pivotal connection with the outer arm of the bell-crank lever 135′ and is disposed above and adjacent the throttle-lever 132. This link carries spaced pins 137 and 138 disposed upon opposite sides of the throttle-lever, as shown. A bell-crank lever 139 is pivotally mounted upon the throttle-lever, as at 139′ and has its opposite end pivoted with the link 136 by a bolt 140′. The pin 138 is normally spaced from the throttle-lever 132, whereby when link 136 is first moved in the direction of the arrow, the bell-crank lever 139 is oscillated, subsequently to which pin 138 engages the throttle lever 132 to effect an oscillation of the same in the direction of the arrow. A spring 140 tends to hold the bell-crank lever 139 against movement.

The numeral 141′ designates a latch suitably mounted upon the throttle-lever 132 and urged in one direction by a spring 142ª. This latch coöperates with teeth 142′ formed on a stationary segment 143′, as clearly shown in Fig. 12. The latch is adapted to lock the throttle-lever 132 in adjustment at different positions and said latch is moved by a rod 144′, connected with a hand-grip 145, which is pivoted to the throttle-lever near its outer end. The rod 144′ is connected with the bell-crank lever 139 through the medium of a link 147′.

As clearly shown in Figs. 12, 13 and 16, a horizontal cylinder 144ª is provided, the same being disposed adjacent the face 133 and provided at one end thereof with an apertured ear 145ª, which is pivoted with a stationary bracket 146ª by means of a bolt 147ª. Within the cylinder 144ª is mounted to reciprocate a piston 143 having connection with a piston rod 144, that has its outer end bifurcated to receive the inner end of the bell-crank lever 135 and be pivotally connected therewith by a bolt 148ª. The pipe 123 has connection with pipe 149, which leads into the inner end of the cylinder 44ª. This connection is such that it does not interfere with the slight swinging movement of the cylinder.

Instead of employing the New York air brake valve hereinabove referred to, I may employ the standard Westinghouse brake valve, shown in Figs. 19 and 20, and designated as a whole by the numeral 147. When the brakes are applied lever 148 is moved in the direction of the arrow, which is in a reverse direction to the brake applying movement of the lever 100, forming a part of the New York air brake valve, as shown in Figs. 15 and 16. The means attached to the lever 148 for moving the same is just like that shown in Figs. 17 and 18 except that the stop 104 is arranged adjacent the opposite end of the segment 94, because said means are pulled to operate the brake valve instead of being pushed. The upper rod 85 must now be moved in a reverse direction to apply the brakes, and this may be accomplished by pivoting the vertically swinging lever 82 intermediate its ends instead of at the lower end of the lever 82. The same three-way valve structure and means for connecting the same with the segment 94 are provided, except that said three-way valve structure will have to be constructed to supply compressed air to the pipe 123 when its lever 130 is oscillated to the right. The apparatus actuated by the three-way valve structure to operate the throttle lever remains the same.

In the operation of the entire system the trains are run in one direction, as illustrated in Fig. 1. To more clearly explain the operation of the system, it may be assumed that block 1′ is occupied and the paddle 20′ is moved to the horizontal or danger position. The block 2′ is in caution condition and the paddle 21′ is moved to assume its intermediate position. The block 3′ is clear and the paddle 22′ is moved to its lowermost position. The operation of the paddles 20′, 21′ and 22′ may be effected manually or by electrical apparatus. When the paddles are operated manually telephonic communication is provided between the ends of the blocks so that the different operators may instruct each other when a train enters or leaves the block. The train being in block 1′, the track circuit will be closed through the train and the electro-magnet 26′ cut out of circuit and deënergized. The armature 29′ will then disengage contact 24, whereby current cannot flow from the source of current 23. The paddle 20′ occupying its horizontal or danger position holds the segment 30ᵃ in its uppermost position and places the segment in engagement with the contact 33ᵃ. The ramp-sections 4 and 5 disposed near the entrance end of the block 1' are thus disconnected from the source of current 23 by two means, namely the deenergized electro-magnet 26' and the contact segment 30ᵃ. Attention is called to the fact that should the paddle 20' have been falsely set to indicate that the block 1' is clear, the electro-magnet 26' being still deënergized, the ramp-sections 4 and 5 could have no electrical connection with the source of current 23. As there is no train in the block 2' a track circuit will be closed and current will flow from one side of the source of current 23' through rail 2, through wire 28', through electro-magnet 26' at the entrance end of block 2', through wire 27' and back to the source of current 23' through the wire 24'. The electro-magnet 26' at the entrance end of the block 2' is now energized and contact 24 engages the armature 29'. The paddle 21' when moved to its intermediate position swings the contact segment 30ᵃ to its intermediate position for engagement with both contacts 31ᵃ and 32ᵃ. The two ramp-sections 4 and 5 near the entrance end of block 2' both have electrical connection with the source of current 23, through armature 29', contact segment 30ᵃ and wires 35ᵃ and 36ᵃ. In connection with block 3' the above described track circuit is closed and the electro-magnet 26' near the entrance end of this block is energized. The paddle 22' assuming its lowermost position, moves the contact segment 30ᵃ to its lowermost position whereby the same disengages the contact 32ᵃ but still remains in engagement with the contact 31ᵃ. The ramp-sections 4 and 5 disposed near the entrance end of block 3' (not shown) are now in a condition to allow the train to enter the block 3', as the ramp-section 5 will have electrical connection with the source of current 23, through armature 29, segment 30ᵃ and wire 35ᵃ while ramp-section 4 will be disconnected from this source of current.

Assuming that an engine is entering block 3' from block 4' and traveling in the direction of the arrow, as soon as the engine moves into proximity to the ramp-sections 4 and 5 (not shown) near the entrance end of block 3', the shoe 31 will engage ramp-section 5 and a circuit will be closed for energizing the solenoids 45 and 69. When this circuit is closed current will flow from the source of current 23, through armature 29', contact segment 30ᵃ, lead wire 36ᵃ through the ramp-section 5, shoe 31, wire 71, solenoid 45, solenoid 69, wire 73, through the frame of the engine and through rail 1 back to the source of current. When the solenoid 45 is energized it swings bell-crank lever 42 and swings the arm 35 to the right, whereby the pin 48 can only operate in the vertical portion of the inverted L-shaped slot 38. Upon further travel of the shoe 31 over the ramp-section 5, it is elevated and moves the arm 35 upwardly. It is obvious that the arm 35 cannot now upon its upward movement effect a movement of the bell-crank lever 51. When the solenoid 69 is simultaneously energized with solenoid 45, it swings the arm 64 to cause the pin 66 to enter the recess 67, when the swinging arm 35 has been sufficiently elevated. The arm 64 does not move the lever 59 until the shoe 31 and its associated members begin to descend and then only if the solenoid 69 is energized. Upon further travel of the engine, the shoe 31 engages the insulated portion 6 of the ramp whereby the above referred to circuit is opened and solenoids 45 and 69 deënergized. Upon further travel of the engine, the shoe 31 engages the ramp-section 4, which as above stated, is disconnected from the source of current. The shoe 31 and its associated members now begin to descend until they disengage the ramp-section 4 when they will again assume their normal positions. The engine now continues its travel in block 3' and approaches the entrance end of block 2'. When the shoe 31 engages ramp-section 5 disposed near the entrance end of block 2', a circuit will be closed for energizing solenoids 45 and 69. In this circuit current will flow from the source of current 23, through armature 29', contact segment 30ᵃ, lead wire 36ᵃ, ramp-section 5, shoe 31, lead wire 71, solenoid 45, lead wire 72, solenoid 69, wire 73, the frame-work of the engine and through rail 1 back to the source of current. When the solenoids 45 and 69 are energized the bell-crank lever 42 is swung, as shown in Fig. 10, to position the pin 48 in the vertical portion of the inverted L-shaped slot 38. The shoe 31 and arm 35 are now elevated but the pin 48 will work idle in the vertical portion of the slot 38 and the bell-crank lever 51 will not be turned. When the arm 35 (see Figs. 7 and 11) has reached its uppermost position the pin 66 will be disposed in horizontal alinement with the recess 67 of swinging arm 64. The solenoid 69 being energized, the arm 64 is swung so that the pin 66 is disposed within the recess 67 and held fast therein. When the shoe 31 engages the insulation 6 the above referred to circuit is opened and solenoids 45 and 69 deënergized. As above stated both ramp-sections 4 and 5 have electrical connection with the source of current. The shoe 31 now engages ramp-section 4 whereby a circuit is closed to again energize the solenoids 45 and 69. In this circuit current will flow from the source of current 23 at the entrance end of block 2', through armature 29', contact segment 30ᵃ, lead wire 35ª, ramp-section 4, shoe 31, lead wire 71, solenoid 45, wire 72, solenoid 69, wire 73, the frame-work of the engine and through the rail 1 back to the source of current. The solenoid 69 being now energized the pin 66 is held fast within the recess 67. The shoe 31 continuing its travel over the ramp-section 4 begins to descend carrying with it the arm 64 and associated members. The arm 64 will now swing lever 59 downwardly. The cable 62 attached to this lever is pulled and the exhaust valve 62′ is operated to sound the whistle 63 in the engine cab, to indicate caution, whereby the engineer is informed that the block 1′ is occupied.

The ramp-sections 4 and 5 near the entrance end of block 1′ are both disconnected from the source of current 23. When the engine moves into proximity to these ramp-sections the shoe 31 engages the ramp-section 5 and is elevated by traveling along the same. No circuit is now closed to energize the solenoid 45 and 69. The pin 48 (see Fig. 7) remains in the horizontal portion of the inverted L-shaped slot 38, whereby when the shoe 31 moves the arm 35 upwardly, the arm 49 will be elevated and bell-crank lever 51 swung. This movement of the bell-crank lever 51 effects a longitudinal movement of the lower push-rod 75, in the direction indicated by the arrow in Fig. 21. The vertically swinging lever 82 is now moved rearwardly and the upper push-rod 85 is moved longitudinally in the direction of its arrow. This movement of the push-rod 85 (see Figs. 17 and 18) will move the shaft 92 and associated members, whereby the stop 104 will engage the pin 96 and swing the lever 100 to operate the air-brake valve, for applying the brakes. The means attached to the shaft 92 and the segment 94 for operating the three-way valve structure 120 are moved, whereby the valve structure is operated and compressed air supplied through the pipe 123 into the cylinder 144ª. The piston 143 is now moved to the left and the bell-crank lever 135′ is swung in the direction of the arrow. This bell-crank lever through the medium of the link 136 causes the bell-crank lever 139 to be swung, in the direction as indicated by the arrow. This movement of the bell-crank lever 139 moves the rod 144′ longitudinally to release the latch 141′. Subsequently to this the bell-crank lever 139 brings the pin 138 into engagement with the throttle lever 132, whereby the latter is swung to cut off the supply of steam.

From the description of the above referred to parts, it is obvious that automatic means are provided for cutting off the supply of steam and for applying the brakes. The steam remains cut off and the brakes stay on after the shoe 31 has passed over the ramp-section 4 and again descends to its normal position. When the shoe 31 descends it carries with it the arm 35, whereby the arm 49 is moved downwardly and the bell-crank lever 51 is swung in a reverse direction and returned to its normal position. The push-rod 75 is now moved forwardly and the upper push-rod 85 is moved in the same direction.

Referring now to Figs. 17 and 18, it will be seen that when the push-rod 85 moves forwardly it carries with it the coupling 90, shaft 92, segment 94 and arm 118. This movement of the segment 94 does not return the lever 100 to its normal position and hence the brakes remain applied. The movement of the arm 118 toward the forward end of the engine does not return lever 130 to its normal position and hence the pressure in the cylinder 144ª is maintained. Attention is called to the fact that the plates 114 and 116 are separate and have slidable engagement. When the engineer desires to remove the brakes, he swings the lever 100 to the right until the same assumes the position shown in Fig. 17. Upon this movement of the lever 100, the pin 131 is engaged by the end of the slot 115, whereby the lever 130 is returned to its normal position and the supply of compressed air cut off from the cylinder and the interior of the cylinder placed in communication with the atmosphere. The engineer may then manually operate the throttle lever 132 for starting the engine.

I wish it understood that the form of my invention herewith shown and described is to be taken as a preferred example of the same and that certain changes in the shape, size and arrangement of parts may be resorted to without departing from the spirit of the invention or the scope of the subjoined claims.

Having thus described my invention, I claim:—

1. In a train control system, a vertically movable structure, an arm pivotally connected therewith and provided near one end with a slot, a swinging lever to oscillate the arm, an electrical device to move said swinging lever, a link provided with means to operate within said slot, a swinging lever connected with the link, means for controlling the application of the brakes, and connecting means between said last named swinging lever and the brake-controlling means.

2. In a train control system, a longitudinally movable structure including a shoe, a swinging arm pivoted to said structure and provided with a slot formed therein, a link carrying a pin adapted to operate within said slot, a pivoted bell-crank lever having connection with the link, means for controlling the application of the brakes, means connecting said bell-crank lever and the first named means, a second pivoted bell-crank lever having a slot formed therein, a pin carried by said swinging arm and disposed in the slot of the second bell-crank lever, an electrical device, connecting means between the same and the second bell-crank lever, and electrical connecting means between the electrical device and said shoe.

3. In a train control system, a longitudinally movable structure including a swinging arm, apparatus adapted to be operated by the longitudinal movement of the arm, means to swing the arm to render the same incapable of operating said apparatus upon the longitudinal movement of said arm, signal-operating apparatus, means connected with said arm to move the signaling apparatus and normally inoperative with relation to fulfilling its function, and means to render the last named means operative.

4. In a train control system of the character described, a ramp, a source of current, means for connection and disconnecting the ramp with and from the source of current, a vehicle carried longitudinally movable bar having a shoe to contact with the ramp, an arm pivotally connected with the bar to move longitudinally therewith and to be swung laterally with relation thereto and having a longitudinal slot provided with a lateral extension, a movable member carrying a pin to operate within the longitudinal slot and lateral extension thereof, electrically operated means having electrical connection with the shoe and adapted when energized to swing the arm in one direction whereby the longitudinal slot receives the pin, and train control means connected with the member carrying the pin to be operated thereby.

5. In a train control system of the character described, a ramp, a source of current, means for connecting and disconnecting the ramp with and from the source of current, a vehicle carried vertically movable bar having a shoe to contact with the ramp, an arm pivotally connected with the bar to move vertically therewith and adapted to be swung in a substantially vertical plane with relation thereto and having a substantially inverted L-shaped slot, a member having a pin normally arranged in the transverse portion of the substantially inverted L-shaped slot, electrically operated means having electrical connection with the shoe and adapted when energized to swing the arm in one direction whereby the longitudinal portion of the substantially inverted L-shaped slot receives the pin, and train control means connected with the member carrying the pin to be moved thereby.

In testimony whereof I affix my signature in presence of two witnesses.

WILLIAM B. MURRAY.

Witnesses:
E. H. CAMPBELL,
C. L. PARKER.